(12) United States Patent
Gilge (10) Patent No.: US 7,783,930 B2
(45) Date of Patent: Aug. 24, 2010

(54) RECORDING METHOD FOR VIDEO/AUDIO DATA

(75) Inventor: Michael Gilge, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 10/409,040

(22) Filed: Apr. 8, 2003

(65) Prior Publication Data

US 2005/0100309 A1 May 12, 2005

Related U.S. Application Data

(60) Provisional application No. 60/454,875, filed on Mar. 14, 2003.

(30) Foreign Application Priority Data

Jan. 10, 2003  (DE) ................................ 103 01 457

(51) Int. Cl.
*G06F 11/00* (2006.01)
(52) U.S. Cl. ....................................................... 714/43
(58) Field of Classification Search ......... 714/746–749, 714/4, 43, 13; 386/46, 125, 113, 21, 10
See application file for complete search history.

(56) References Cited

U.S. PATENT DOCUMENTS

| | | | | |
|---|---|---|---|---|
| 2,005 | A | * | 3/1841 | Shepherd et al. ............. 249/126 |
| 4,511,886 | A | | 4/1985 | Rodriguez |
| 5,345,430 | A | * | 9/1994 | Moe ............................... 369/7 |
| 5,537,416 | A | | 7/1996 | MacDonald et al. |
| 5,541,933 | A | * | 7/1996 | Basnuevo et al. ........... 714/708 |
| 5,558,638 | A | | 9/1996 | Evers et al. .................... 604/66 |
| 5,619,489 | A | * | 4/1997 | Chang et al. ................. 370/241 |
| 5,710,970 | A | | 1/1998 | Walters et al. |
| 5,930,816 | A | * | 7/1999 | Fujita ........................... 711/104 |
| 6,032,180 | A | | 2/2000 | Nishikawa |
| 6,098,180 | A | * | 8/2000 | Kobata et al. .................. 714/18 |
| 6,269,460 | B1 | * | 7/2001 | Snover ......................... 714/48 |
| 6,289,054 | B1 | * | 9/2001 | Rhee ....................... 375/240.27 |

(Continued)

FOREIGN PATENT DOCUMENTS

DE 197 05 678 8/1998

(Continued)

OTHER PUBLICATIONS http://delivery.acm.org/10.1145/170000/168638/p231-jones.pdf?key1=168638&key2=8261067311&coll=ACM&dl=ACM&CFID=65923692&CFTOKEN=98503563 by Alan Jones ,Andrew Hopper.*

(Continued)

*Primary Examiner*—Robert Beausoliel
*Assistant Examiner*—Amine Riad
(74) *Attorney, Agent, or Firm*—Lipsitz & McAllister, LLC (57) ABSTRACT

In order to provide a recording method for data which have been or are being generated at a data source in a time sequenced manner and are transmitted via a digital network to at least one recording device for storage, by means of which method the data can be reliably recorded, it is provided that the data are stored at the data source before the transmission on the digital network in such a way that, after a fault on the digital network, data which were intended for transmission during the period of the fault can be made available to the at least one recording device.

2 Claims, 4 Drawing Sheets

U.S. PATENT DOCUMENTS

| | | | |
|---|---|---|---|
| 6,393,470 | B1 | 5/2002 | Kanevsky et al. |
| 6,417,672 | B1* | 7/2002 | Chong ........................ 324/520 |
| 6,453,345 | B2* | 9/2002 | Trcka et al. ................. 709/224 |
| 6,460,095 | B1* | 10/2002 | Ueno et al. .................... 710/52 |
| 6,556,769 | B1* | 4/2003 | Akahane et al. ............... 386/46 |
| 6,571,271 | B1* | 5/2003 | Savitzky et al. ............. 709/200 |
| 6,675,386 | B1* | 1/2004 | Hendricks et al. ........... 725/105 |
| 6,698,021 | B1* | 2/2004 | Amini et al. ................. 725/105 |
| 6,826,351 | B1* | 11/2004 | Tsujisawa et al. ............. 386/83 |
| 6,862,401 | B1* | 3/2005 | Higashida et al. ........... 386/100 |
| 6,891,566 | B2* | 5/2005 | Marchese ................ 348/211.3 |
| 6,895,165 | B2* | 5/2005 | Boys ............................ 386/46 |
| 6,970,712 | B1* | 11/2005 | Vo ............................... 455/510 |
| 7,120,822 | B2* | 10/2006 | Lin ................................. 714/6 |
| 2001/0005169 | A1 | 6/2001 | Tsuzuki et al. |
| 2002/0003575 | A1 | 1/2002 | Marchese |
| 2002/0095615 | A1* | 7/2002 | Hastings et al. ................ 714/4 |
| 2003/0117500 | A1* | 6/2003 | Lin ......................... 348/211.3 |
| 2005/0076387 | A1* | 4/2005 | Feldmeier ................... 725/114 |
| 2005/0198272 | A1* | 9/2005 | Bernard et al. ............. 709/224 |

FOREIGN PATENT DOCUMENTS

| | | |
|---|---|---|
| DE | 197 28 469 | 1/1999 |
| DE | 695 25 318 | 2/2002 |
| EP | 0 715 466 | 2/2002 |
| WO | 96/02106 | 1/1996 |
| WO | 01/27763 | 4/2001 |
| WO | 01/45388 | 6/2001 |
| WO | 01/65862 | 9/2001 |
| WO | 02/33558 | 4/2002 |
| WO | 03/036936 | 5/2003 |

OTHER PUBLICATIONS

Mobotix AG, "Mobotix-Concept Network-CCTV & WebCam Part 1", Mobotix AG, Security Vision Systems, May 2002, 23 pages.

Gilge, Michael, "Networked Video for CCTV Applications: The Network is the Multiplexer", ES International Nr. 2, 2001, pp. 8, 9, 12-15, 2001.

Lu, Der-Jen, et al., "Experience in Designing a TCP/IP Based VOD System over a Dedicated Network", IEEE, Dec. 2, 1997, pp. 262-266.

Wang, Yao et al., Video Processing and Communications, Prentice Hall, Signal Processing Series, Sep. 27, 2001, pp. 472-561.

"VCS—Umfassendes Produktportfolio für die professionelle Videofernüberwachung und Live-Video-Übertragung", Produkte & Service für die Industrie 2000, GIT VERLAG GmbH, Jul. 7, 2000, pp. 146-147.

*Patent Abstracts of Japan*, "Device for Decoding Moving Image and Method Therefor", Publication No. 10243377, Sep. 11, 1998, Application No. 09047556, filed Mar. 3, 1997.

* cited by examiner

RECORDING METHOD FOR VIDEO/AUDIO DATA

The present disclosure relates to the subject matter disclosed in German application No. 103 01 457.8 of Jan. 10, 2003, which is incorporated herein by reference in its entirety and for all purposes.

BACKGROUND OF THE INVENTION

The invention relates to a recording method for data which have been or are being generated at a data source in a time sequenced manner and are transmitted via a digital network to at least one recording device for storage.

An example of data which are generated at a data source in a time sequenced manner are video/audio data. A data acquiring device, which for example comprises a camera or a microphone, generates a data stream which contains corresponding image information or sound information, the time sequence of the data being of major significance.

Recording methods of this type in conjunction with video data are also known by the designation NVR (networked video recording). The data acquiring device feeds data streams of digital video and/or audio data into the digital network and the recording device, which is for example a computer with sufficiently large storage capacity, records the data. The recording is performed in this case in particular for archiving and/or evaluation.

Since the digital network pre-exists and, in particular, exists independently of the data acquiring device and the recording device, this allows video surveillance systems, for example, to be formed in a simple way.

SUMMARY OF THE INVENTION

In accordance with the present invention, a recording method is provided by means of which the data can be reliably recorded.

This is achieved by the data being stored at the data source before the transmission on the digital network in such a way that, after a fault on the digital network, data which were intended for transmission during the period of the fault can be made available to the at least one recording device.

It is characteristic of video data and audio data that they occur in the form of a data stream, since the data are generated in a time sequenced manner. If there is then a fault of the data transmission on the digital network, the data recorded during the period of the fault are missing on the recording device, so that data gaps occur there. Since it is provided according to the invention to record the data also at the data source, after a fault of the data transmission on the digital network the data supplied during the period of the fault can be transmitted to the recording device in order to fill the data gap there.

Consequently, the recording method in accordance with the present invention allows a complete data recording, in which data losses are avoided, to be realized on the recording device.

The method according to the invention allows a fault-tolerant network-based data recording to be achieved, i.e. faultless recording on the recording device is ensured even in the case of prolonged network problems, so that a complete data stream without gaps has been stored on the recording device even in the event of network problems in the past.

The data generated in a time sequenced manner are, in particular, video data and/or audio data. The video/audio data are in this case generated by at least one data acquiring device, which comprises a camera and/or a microphone. A video server and/or audio server, which converts analog image data or analog sound data into digital image data or digital sound data, which can then correspondingly be transmitted on the digital network, may also be provided in this case.

It may be provided that the data generated in a time sequenced manner are stored in a recording apparatus, from which the data are then transmitted via the digital network to the at least one recording device. As a result, a data exchange takes place between a recording apparatus (which does not necessarily have to be associated with a recording device) and the recording device connected to this recording apparatus via the digital network. The said recording apparatus then comprises the data memory, which buffer-stores data before the transmission to the digital network, in order in the event of transmission faults to be able to fill data gaps on the recording device which is intended to receive the data of the recording apparatus.

In particular, it is provided that a data recording associated with a data transmitter takes place for data buffer storage. The data transmitter may in this case be, for example, a digital camera, which provides digital video data, or a video server, which is connected downstream of an analog camera and converts the analog video data into digital data. The data recording allows data to be buffer-stored before being transferred to the digital network, in order in this way to avoid a data loss during the fault of the data transmission on the digital network.

Furthermore, it is advantageous if the recording of the data at the data source is performed independently of the recording of the data on the recording device, in order in this way to be protected against data loss in the event of faults in the data transmission, which are caused for example by network inactivity or network overload.

In particular, a data recording takes place at a data receiver, that is the recording device. On the data receiver, which is coupled to the digital network, the permanent recording of the data takes place, in particular for archiving and evaluation.

It is most particularly advantageous if test signals are sent via the digital network in order to be able to detect faults with respect to the data transmission on the digital network. This allows both the transmitter (for example the data acquiring device) and the receiver of the actual data, such as video data, (the recording device) to detect a fault and ascertain as a result whether data gaps are present (on the recording device) or whether data have to be transmitted in a way corresponding to a data gap on the recording device. Furthermore, the data acquiring device can ascertain whether data can be transmitted without faults.

It is then advantageous if changes in status with respect to data transmission faults are registered by the at least one data acquiring device and the at least one recording device. Then a log book in which the changes in status and, in particular, the instants (points in time) of changes in status are registered can be prepared. As a result, the data which have been produced on the digital network during the fault of the data transmission can once again be determined. Furthermore, the data gaps can be ascertained on the recording device.

It is then advisable in particular if a data recording of a data source before transfer of the data to the digital network is carried out at the latest when a fault of the data transmission is detected. This allows data losses to be avoided, the data recording in particular being carried out continuously.

It is then advantageous if a transmission of data recorded at the data source via the digital network is initiated when freedom from faults is detected after a fault of the data transmission. The data recorded during the fault of the data transmission can then be transmitted to the recording device, in order to be able to fill a data gap there, so that the recording device can once again archive the complete data and the complete data are once again available for evaluation.

Then, after a fault of the data transmission, data recorded at the data source corresponding to the period of the fault are transmitted via the digital network to the at least one recording device, and in this case transmitted in particular automatically, in order to be able to fill data gaps present on the recording device.

In particular, a data gap produced during the fault of the data transmission on the at least one recording device is filled automatically by transmission of the data recorded at the data source during the period of the fault to the at least one recording device.

For data recording of a data source, in this case a data memory is provided. The storage capacity for the data recording at the data source is preferably chosen in dependence on a transmission rate for the data and a predetermined expected maximum fault period. It is possible as a result to set, for example, volatile memories or non-volatile memories such as hard disk drives, their storage capacity, and consequently also their size and energy consumption, being adaptable and, in particular, not needing to be overdimensioned.

In particular, the storage capacity is in this case chosen to be large enough that, during the data transmission of data from the data recording of a data source to the digital network, new data from the data source can be recorded. For example, the storage capacity is determined for this purpose by multiplying the transmission rate by the expected maximum fault period, adding a safety margin and doubling this capacity. The same amount of data that is passed on to the recording device after a maximum fault period of the digital network can then be written into the data memory.

It is in this case provided that, in the event of successful transmission via the digital network, data are erased from the data recording at the data source, in order to be able to minimize the necessary storage capacity there.

In particular, it is advantageous if the reading out of data from the data memory on the recording device for the transmission of the data on the digital network is coupled to the writing of new data into the data memory, data written in being more up-to-date than the data read out. This allows a kind of virtual data memory to be created, with a storage capacity which is greater than the storage capacity of the data memory at the data source.

In particular, the erasure of the data recorded at the data source only takes place when the data received by the at least one recording device have been checked for intactness.

The invention also relates to a data acquiring device for video/audio data which comprises an interface to a digital network for the transmission of data via the digital network.

The invention is in this case based on the object of providing a data acquiring device by means of which data can be reliably transmitted on the digital network.

This object is achieved according to the invention by providing a data memory by means of which data can be recorded before transfer to the digital network, in order to be able after a transmission fault on the digital network to provide data which were generated during the period of the fault.

This data acquiring device according to the invention is in this case intended in particular for carrying out the recording method according to the invention and has the advantages described there.

Further advantageous configurations have likewise already been explained in conjunction with the method according to the invention.

In particular, a detection apparatus is provided, by means of which test signals can be emitted to the digital network and by means of which faults of the data transmission can be detected.

It is also advantageous if a registration apparatus is provided, by means of which changes in status with respect to faults in the data transmission can be registered.

Furthermore, it is advantageous if a control apparatus is provided, by means of which data from the data memory which were produced during a fault of the data transmission on the digital network can be transmitted on the digital network. The control apparatus then provides reading out of the corresponding data and transmission on the digital network, in order to be able in this way to fill a data gap on a recording device.

The data acquiring device in this case comprises a camera and/or a microphone. The camera may be a digital camera. An analog camera, which is connected to a video server which converts the analog data into digital data, may also be provided. The same applies correspondingly to a microphone.

The invention also relates to a recording device for video/audio data, comprising:
an interface for a digital network, via which data can be received from the digital network; and
a data memory for recording the data.

According to the invention, in this case a detection apparatus is provided, by means of which test signals can be emitted to the digital network and/or test signals can be received from the digital network, in order to be able to detect faults of the data transmission from a data acquiring device.

This recording device according to the invention has the advantages already described in conjunction with the method according to the invention and the data acquiring device according to the invention. This recording device allows the recording method according to the invention to be carried out.

Further advantageous configurations have likewise already been explained in conjunction with the method according to the invention and the data acquiring device according to the invention.

The invention also relates to a recording system for video/audio data, this recording system comprising at least one data acquiring device according to the invention and at least one recording device according to the invention.

The following description of preferred embodiments serves in conjunction with the drawing for a more detailed explanation of the invention.

DETAILED DESCRIPTION OF THE INVENTION

Figure 1:
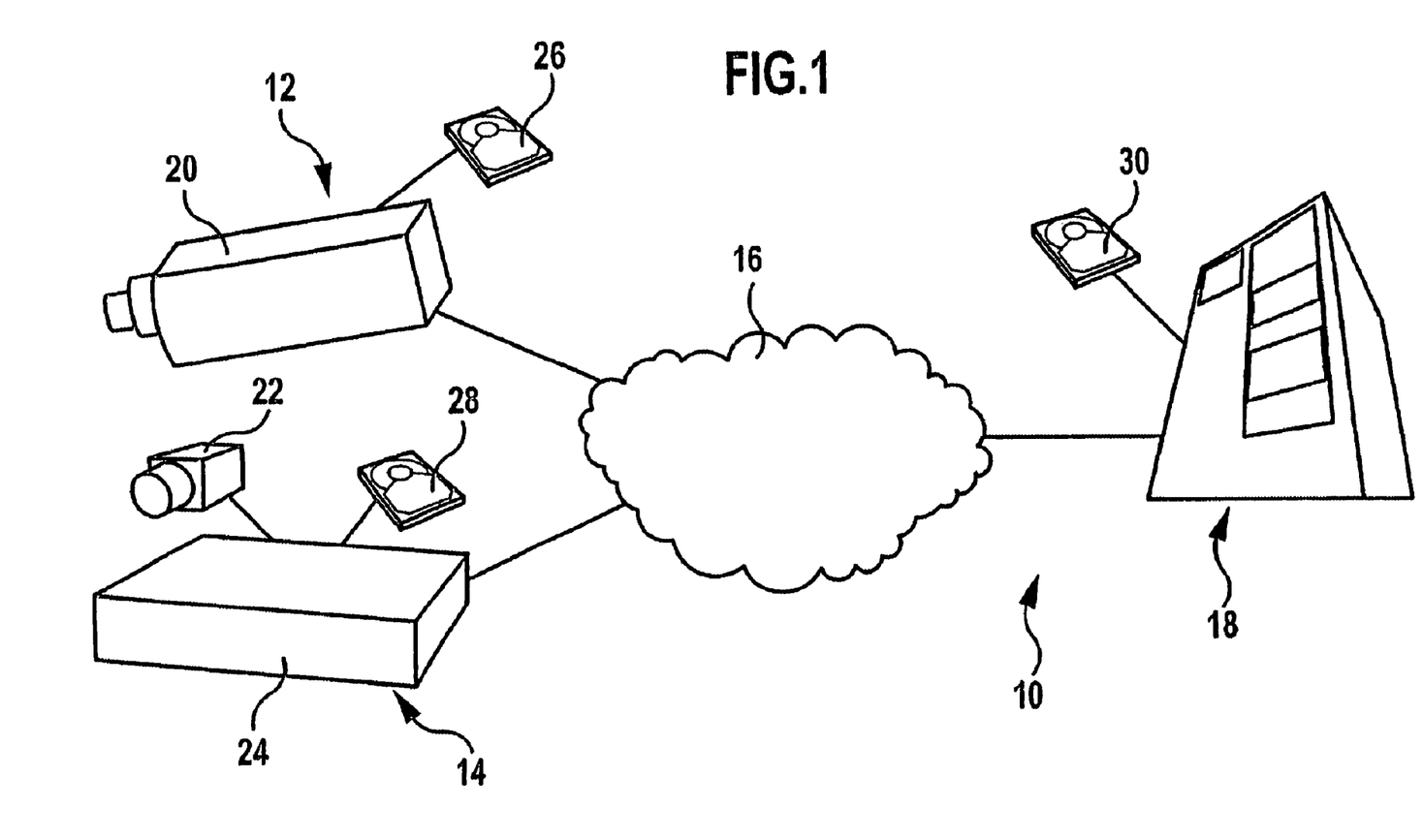
FIG. 1 shows a schematic representation of an NVR video/audio system.

A recording system for video/audio data based on the NVR principle (NVR—networked video recording), which is shown in FIG. 1 and designated there overall by 10, comprises one or more data acquiring devices 12, 14, which provide video/audio data. These video data and/or audio data are in this case generated in a time sequenced manner and provided as digital data or converted into digital data and transmitted on a digital network 16 to a recording device 18 (network video recorder), which records, in particular permanently, the data supplied by the data acquiring devices 12, 14, in order for example to be able to archive and evaluate them.

The data acquiring devices 12, 14 comprise cameras and/or microphones. It may be envisaged in this case for one data acquiring device (in FIG. 1 the data acquiring device 12) to have a digital camera 20 and/or a digital microphone; digital video data and/or audio data are then provided directly.

It may alternatively or additionally be envisaged that analog data acquiring devices, such as for example an analog camera 22 and/or an analog microphone, are provided. Connected downstream of these as an AD converter is, for example, a video server 24, in order to be able to provide the corresponding digital data which can be transmitted on the digital network 16.

The digital network 16 is, in particular, a pre-existing network that is independent of the system 10. The data acquiring devices 12, 14 and the recording device 18 then have corresponding communication interfaces 25 (FIG. 4) and 29 (FIG. 5), by which they can be respectively coupled to the digital network 16, in order to be able to pass data to the digital network 16, i.e. be able to transmit data via the digital network 16, and be able to receive data from the digital network 16.

The digital network 16 may be a public network, such as for example the Internet, an ISDN network, a GSM network or a UMTS network. It may, however, also be a proprietary network, which is formed for example via leased lines. An example of such a network is a company's in-house intranet. The digital network 16 may be a local network (LAN—local area network) or a non-local network (WAN—wide area network).

The data are transmitted on the digital network 16 according to a specific protocol, such as for example TCP/IP.

It is characteristic in the case of video data and audio data that there is a time sequence of the data, i.e. a data stream, the time sequence being of decisive significance for evaluability and archiving. The data aquired in a time sequenced manner by the data acquiring devices 12, 14 must also be recorded in this sequence on the recording device 18 in order to make it possible for them to be evaluated. In the case of NVR systems 10, there is in this case the problem that faults in the data transmission on the digital network 16 may lead to gaps in the recording of the recording device 18.

It is consequently envisaged according to the invention that the video data and/or audio data supplied for example by the digital camera 20 of the recording device 12 or the video server 24 of the recording device 14 are likewise recorded at the data source, in order to be able after a fault of the data transmission on the digital network 16 to provide data which have been generated during the time period of the fault by the digital camera 20 or the analog camera 22.

For this purpose, associated with each data acquiring device 12, 14 is a respective data memory 26, 28, by means of which the video data and/or audio data can be recorded independently of the recording on the recording device 18 at the data source before the data transmission.

The data memories 26, 28 may be volatile or non-volatile memories. Preferred, however, are non-volatile memories, such as for example hard disk memories. Such data memories 26, 28 may in this case be integrated in housings, for example of the digital camera 20 or of the video server 24, or be arranged separately. They are, however, in each case a component part of the associated data acquiring device 12 or 14.

The recording device 18 likewise has one or more data memories 30, such as for example hard disk drives, the storage capacity of the recording device 18 being significantly greater than the storage capacity of the data memories 26 and 28 at the data source.

The data recording on the data acquiring devices 12, 14, i.e. at the data source, takes place independently of the data recording on the recording device 18, i.e. the data receiver of the data transmitted from the data acquiring devices 12, 14 via the digital network 16.

Figure 4:
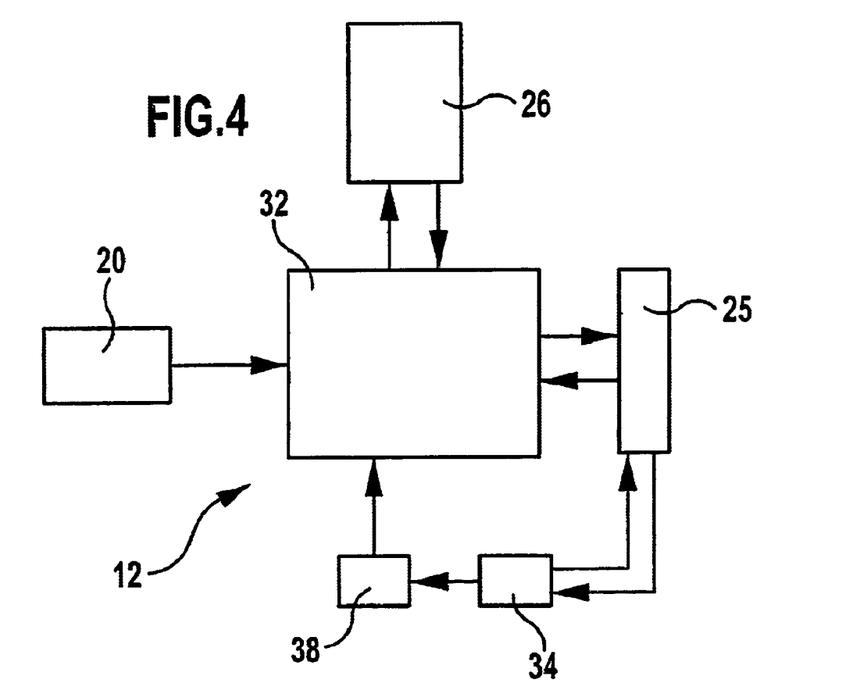
FIG. 4 shows a schematic representation of components of an exemplary embodiment of a data acquiring device according to the invention.

As schematically shown in FIG. 4, the data acquiring devices, such as for example the data acquiring device 12, respectively comprise a control apparatus 32, which may take the form of hardware or software, which controls the data recording on the data memory 26, i.e. controls in particular the writing in and reading out of data, these data being supplied by the digital camera 20.

The control apparatus 32 is coupled to the interface 25, in order to be able to send corresponding data to the digital network 16 and be able to receive signals from the digital network 16.

Furthermore, a detection apparatus 34 is provided, which is coupled to the interface 25, via which test signals (life check signals) can be sent to the digital network 16 and corresponding test signals can be received from the digital network. These test signals, which are sent for example at fixed time intervals, serve the purpose of being able to detect faults of the data transmission on the digital network 16. Such faults are caused, for example, by network components such as switches, routers or the like failing, components being connected incorrectly or not connected to the digital network 16 or the data transmission rate on the digital network 16 not being adequate on account of heavy network traffic.

Figure 5:
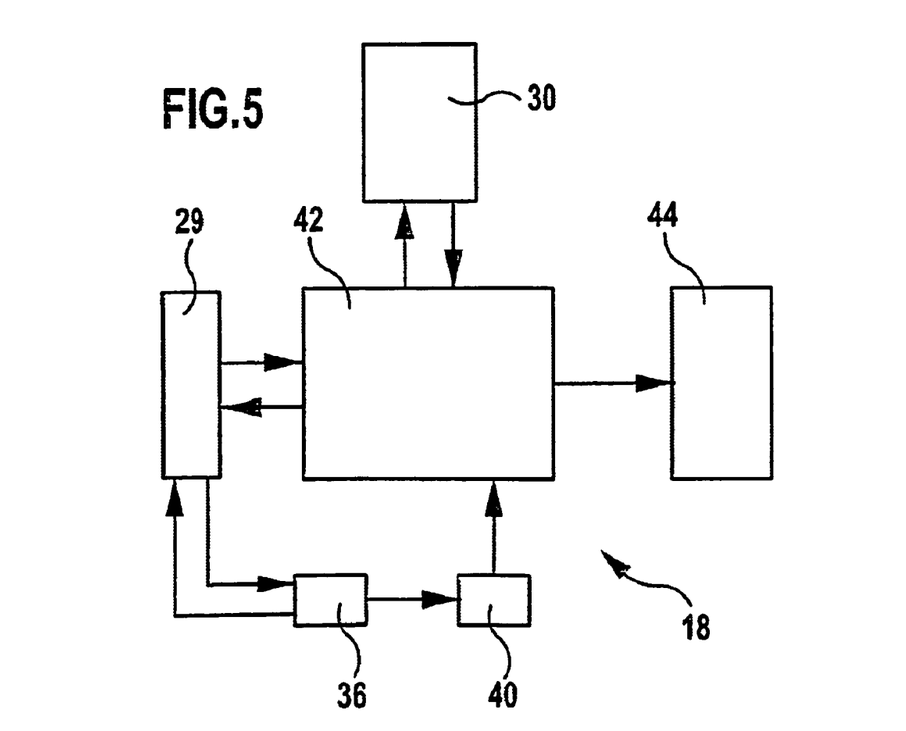
FIG. 5 shows a schematic representation of components of an exemplary embodiment of a recording device according to the invention.

The data acquiring device 12 in this case exchanges these test signals with the recording device 18, which likewise has a detection apparatus 36, which is in connection with the interface 29 there. The exchange of test signals between the data acquiring device 12 (and if appropriate further data acquiring devices 14 etc.) and the recording device 18 allows data transmission faults on the digital network 16 to be detected and registered both by the data acquiring device 12 and by the recording device 18.

For this purpose, a registration apparatus 38 is provided on the data acquiring device 12 and a registration means 40 is provided on the recording device 18. These registration means 38, 40 keep a log book with respect to data transmission faults on the digital network 16, in particular with respect to the points in time of changes in status in the faults. Consequently, the point in time (instant) of a fault and the time period of such a fault are registered.

Consequently, the data acquiring device 12 can then generate information as to which video data and/or audio data (corresponding to a specific time period) have not been transmitted, or not successfully, to the recording device 18, i.e. which part of the data stream has not been transmitted, and the recording device 18 can generate the corresponding information as to when there is a data gap in the recording on account of faulty data transmission. The registration apparatus 38 and 40 are in this case synchronized with each other via the test signals, so that the registration apparatus 38 and 40 contain the same information with respect to the point in time and time period of data transmission faults on the digital network 16.

The registration apparatus 38 is connected to the control apparatus 32, in order to be able to control a data transmission on the basis of the stored status information with respect to data transmission faults. In the same way, the registration apparatus 40 is connected to a control apparatus 42 of the recording device 18, this control apparatus 42 controlling in particular the recording by the data memory or memories 30. The control apparatus 42 of the recording device 18 is also connected to an evaluation apparatus 44, by means of which the recorded data can be evaluated.

The method according to the invention functions as follows:

The data are stored at the data source, such as the data acquiring device 12, independently of the recording device 18, i.e. this data recording at the data source takes place upstream of the digital network 16 and consequently independently of possible data transmission faults on the digital network 16. The storage capacity of the data memory 26 is in this case chosen such that, at a specific data transmission rate to the digital network 16 and on the digital network 16, video data and/or audio data are recorded at the data source for a predetermined time period. The predetermined time period is in this case adapted to the maximum expected time period of the data transmission fault. If, for example, the data transmission for the video/audio data stream is 1 bit per s, and a maximum fault time of 8 hours is expected, the storage capacity of the data memory 26 is at least 4 MB, if allowance is also made for a safety margin.

This storage capacity should preferably be doubled, in order to make it possible during the reading out of buffered data from the data memory 26 for data to be read in (to protect against data losses in the event of a possible network fault).

Figure 2A:
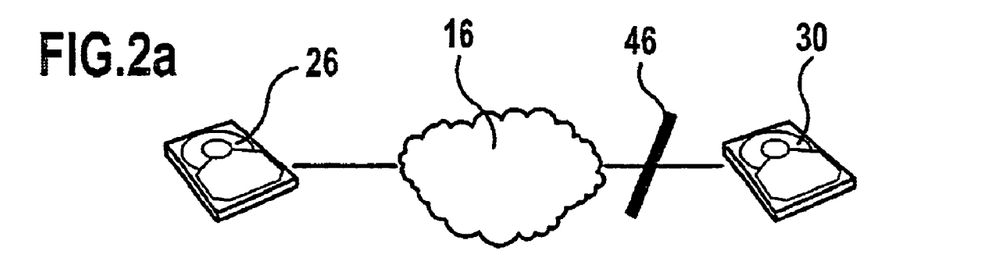
FIGS. 2a, 2b show a schematic representation of the data recording in the event of faults in the network transmission.
Figure 2B:
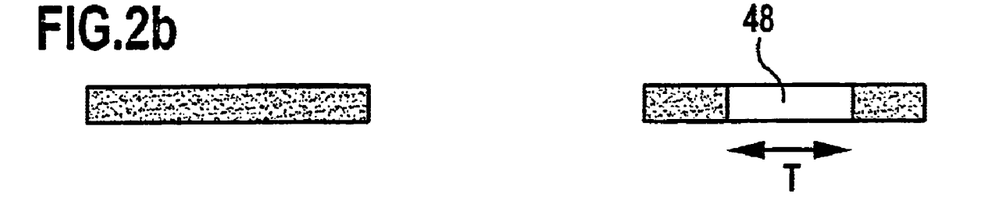

The recording operation during a fault 46 of the data transmission on the digital network 16 is schematically shown in FIGS. 2a and 2b. During the time period T of the fault (FIG. 2b), the recording device 18 does not receive any acquired data, so that there is a data gap 48 in the recording of the data memory 30.

However, the solution according to the invention of data recording at the data source by the data memory 26 has the effect that the data are likewise recorded independently of the recording device 18, to be precise without gaps, since the data recording takes place directly at the data source. This is indicated in FIG. 2b. The data occurring during the fault of the data transmission on the digital network 16 are in this case stored in the data memory 26, so that they can be used to fill the data gap 48 in the data memory 30 of the recording device 18 once the transmission fault is no longer occurring.

The respective detection apparatus 34, 36 of the data acquiring device 12 and of the recording device 18 in this case detect the fault 46 from the exchange of the test signals and the corresponding status information is stored in the registration apparatus 38, 40, so that a time frame can be put on the data gap 48 both at the data acquiring device 12 and at the recording apparatus 18, i.e. the time at which the data gap 48 begins and the time at which the data gap 48 ends (consequently also the length of time of the data gap 48) are known.

Figure 3A:
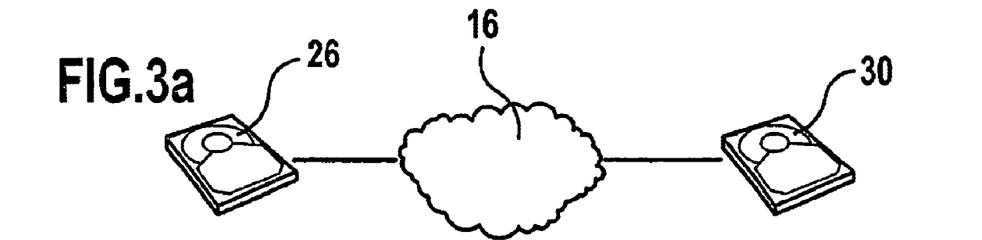
FIGS. 3a to 3d schematically show the data transmission after ending a fault in the network transmission.
Figure 3B:
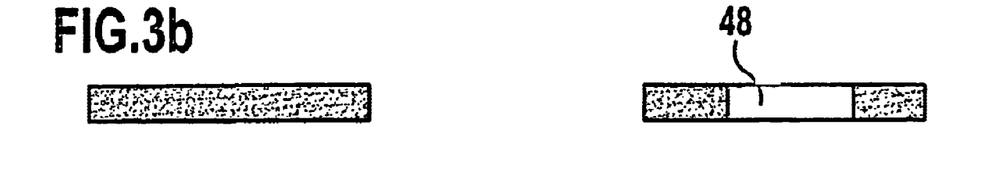
Figure 3C:
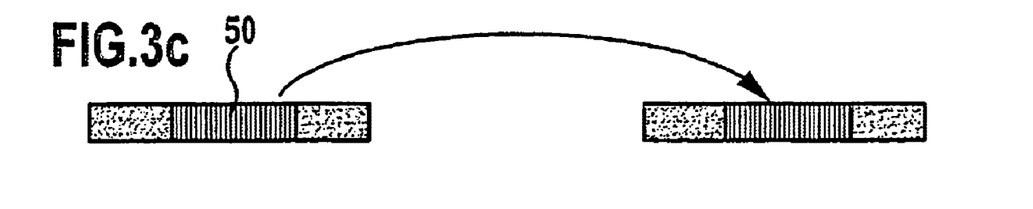
Figure 3D:
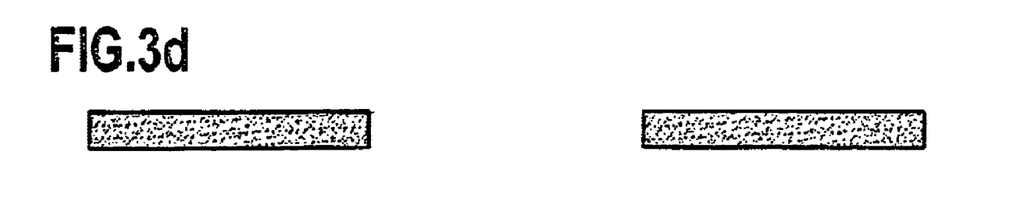

Freedom from faults of the transmission on the digital network 16 is detected from the exchange of the test signals by the testing means 34, 36. This status is indicated after the fault status 46 in FIG. 3a. At the beginning of the detection of the freedom from faults, the data gap 48 is contained in the data recording of the recording device 18, while the missing data in the data recording are present at the data source, i.e. are contained in the data memory 26 (FIG. 3b). The corresponding data 50 are then read out by the control apparatus 32 from the data memory 26 on the basis of the entry in the registration apparatus 38 and are transmitted on the digital network 16. The control apparatus 42 of the recording apparatus 18 places these data in the memory area of the data memory 30 which corresponds to the data gap 48 (FIG. 3c). As a result, the data recording on the recording device 18 is completed, i.e. complete data are present here without gaps, and consequently a complete data stream is also recorded there. This is indicated in FIG. 3d.

Consequently, the data recording at the data source, i.e. associated with the data acquiring device 12, can be used to "repair" data gaps 48 on the recording device 18 on account of faults of the data transmission on the digital network 16, i.e. the missing data are read out from the data memory 26 and read into the data memory 30. This operation takes place in this case by means of the control apparatus 32 and 42, in particular automatically, so that a complete data recording with respect to the data generated by the digital camera 20 is made possible on the recording device 18, at least after a time delay. According to the invention, a fault-tolerant network-based video/audio data recording method is provided.

Figure 6:
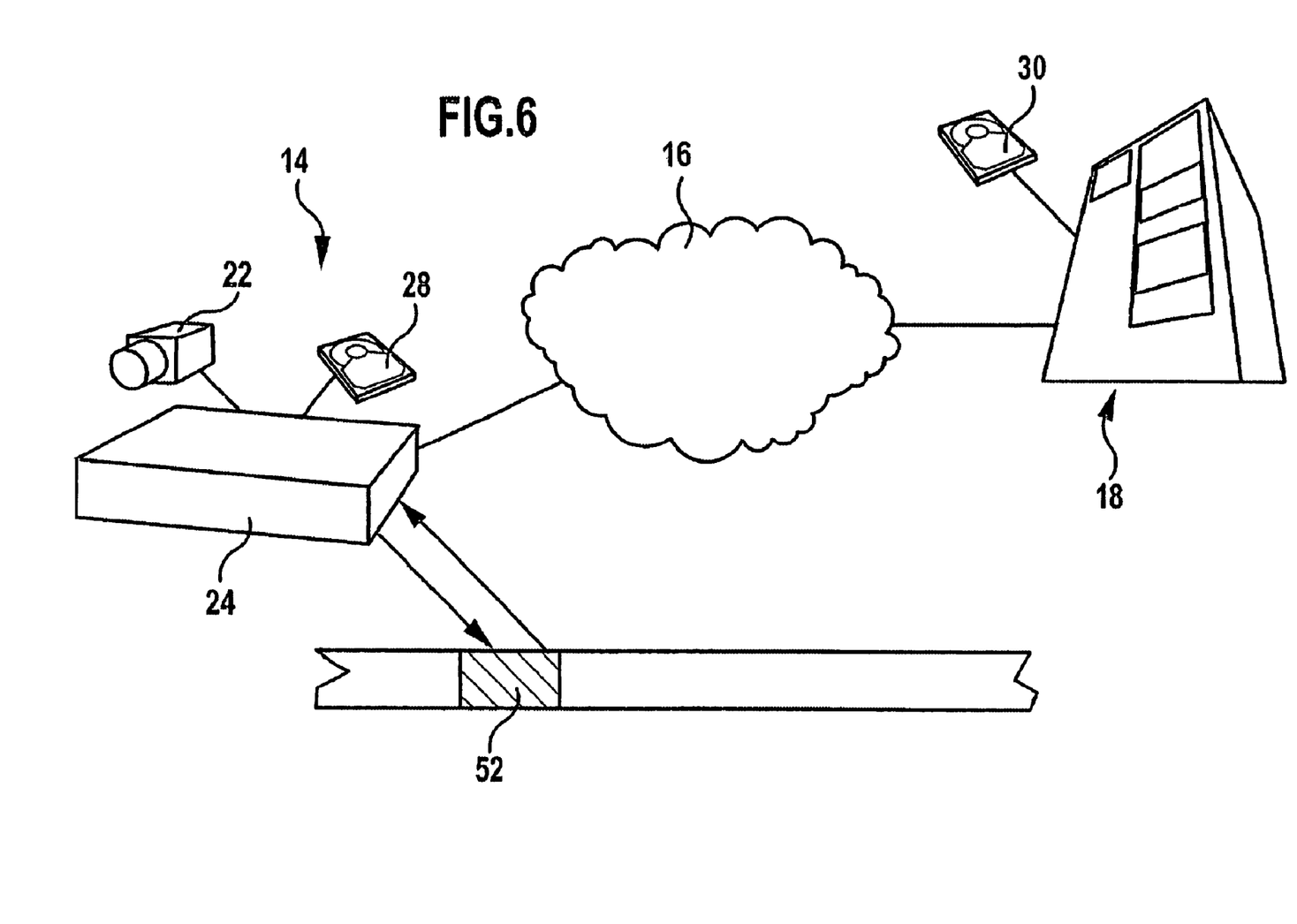
FIG. 6 shows a schematic representation of an exemplary embodiment of a memory management system according to the invention.

The capacity of the data memory 26 on the data acquiring device 12 or of the data memory 28 on the data acquiring device 14 is usually restricted for reasons of space alone. The method of recording video/audio data according to the invention makes it possible, however, to increase the storage capacity at the data source by forming a virtual data memory. This is schematically represented in FIG. 6 on the basis of the data acquiring device 14.

The data memory 28 of the data acquiring device 14 has a specific capacity 52. The data memory or memories 30 of the recording device 18 have a very much higher capacity. It is consequently envisaged according to the invention that the data memory 28 and the data memory 30 are connected. This is described for example on the basis of a connection by the digital network 16. This allows the reading out of data from the data memory 28 for the transmission of these data on the digital network 16 to be logically connected with the writing in of new data into the data memory 28. This coupling provides the video server 24 (or in the case of the data acquiring device 12 the digital camera 20) with a virtual data memory, the capacity of which corresponds at least to the capacity of the data memory or memories 30 of the recording device 18.

As a result, associated with the data acquiring device 12 or 14 is a data memory with "endless" capacity, at least this virtual data memory having a capacity which is very much higher than the capacity of the data memory 28 of the data acquiring device 14.

The reading out of the data from the data memory 28 for transmission on the digital network 16 has the effect that these data are copied, i.e. the same set of data is on the one hand present in the data memory 28 and is on the other hand transmitted on the digital network 16 and then stored in the data memory 30. After successful recording of these data by the recording device 18 and checking of the data for intactness, the transmitted data can then be erased from the data memory 28.

The writing of data into the data memory 28 takes place in this case continuously on account of the supply of new data, for example by the analog camera. The operation of reading out the data from the data memory 28 for the transmission of these data on the digital network 16 to the recording device 18 may in this case likewise take place continuously and, in particular, at the same rate as the writing in of the data.

It may also be provided that the data are read out from the data memory 28 at time intervals in the form of data packets and then transmitted on the digital network 16. This reading-out operation is in this case controlled in particular by a specific capacity threshold being reached, such as for example a capacity threshold at or below 50% of the total capacity of the data memory 28. The reading-out operation (i.e. the copying operation) then takes place at a rate which is greater than the rate of writing into the data memory 28.

It is preferably provided that more up-to-date data are written into the data memory 28, while older data are copied onto the digital network 16 for recording on the recording device 18. The memory management of the data memory 28 then takes place on the basis of the FIFO principle (first in-first out).

This process of copying the data from the data memory 28 for transmission on the digital network 16 takes place in this case under the control of the control apparatus 32.

The control apparatus 32 is in contact with the control apparatus 42 of the recording apparatus 18, in order after reception of sent data by the recording apparatus 18 to obtain a release if the data received by the recording device 18 are intact. After such a release, the copied data can then be erased from the data memory 26.

The method according to the invention for recording video/audio data allows the storage capacity of the data acquiring device 14 (and possible further data acquiring devices 12) to be greatly increased. This makes it possible to ensure that the data memory 26 at the data source does not reach its capacity limits.

The operation of copying data between the data memory 28 of the data acquiring device 14 and the data memory 30 of the recording device 18 takes place to a certain extent invisibly or transparently for the data acquiring device 14; only a relatively small part of the data actually physically lies in the data memory 28 of the data acquiring device 14. A greater part of the data is relocated into the data memory 30, although the data contained in the data memory 30 can also be read out via the data acquiring device 14. If a user wishes to read out data at the data acquiring device 14, he cannot distinguish whether the data originate directly from the data memory 28, i.e. are physically present there, or have been relocated into the data memory 30 and first have to be fetched back from there.

With respect to the data acquiring devices 12 and 14, the data memory 30 or the recording device 18 is a central recording unit, which can be shared by a plurality of independent data acquiring devices, in order by means of forming a virtual data memory to increase the storage capacity—virtually—at the individual data acquiring devices.

It has been described above that the data memory 30 is arranged at a recording device 18 which is connected to the data acquiring devices 12 and 14 via the digital network 16. However, it may also be provided that the connection does not take place via a digital network but for example by means of direct wiring.

In combination with the recording method according to the invention, which has been described above, temporary faults of the data transmission on the digital network 16 can then be tolerated without data loss on the recording device 18. The storage capacity and, in particular, hard disk capacity of the data memory 26, can be adjusted to the transmission rate and the maximum expected fault period. The "actual" data recording for archiving and evaluation of the data takes place on the recording device 18, which has considerably higher storage capacity. The data buffering at the data source allows data gaps on account of faulty data transmission to be filled.

The solution according to the invention also makes it possible to correct a fault of the data transmission on the digital network 16 during the data copying to the digital network 16.

The invention claimed is:

1. Recording device for video/audio data, comprising:
   an interface for a digital network, via which data are receivable from the digital network;
   a memory for recording the data, and
   a detection apparatus for emitting test signals to the digital network at fixed time intervals in order to be able to detect faults of the data transmission from a data acquiring device;
   a control apparatus, by means of which, after a detected fault, received data which have been recorded during a period of the fault and are transmitted after ending of the fault are written into the memory in a data gap in a correct time sequence.

2. Recording device according to claim 1, wherein a registration apparatus is provided, by means of which changes in status with respect to faults in the data transmission are registerable.

* * * * *